United States Patent
Szabo et al.

(10) Patent No.: US 10,137,619 B2
(45) Date of Patent: Nov. 27, 2018

(54) HEADER FOR MODULE OF HOLLOW FIBER MEMBRANES AND METHOD OF POTTING HOLLOW FIBERS

(71) Applicant: ZENON TECHNOLOGY PARTNERSHIP, Wilmington, DE (US)

(72) Inventors: Robert Szabo, Szekesfehervar (HU); Gabor Bakos, Budapest (HU); Attila Palinkas, Budapest (HU); Steven Kristian Pedersen, Burlington (CA)

(73) Assignee: ZENON TECHNOLOGY PARTNERSHIP, Wilmington, DE (US)

( * ) Notice: Subject to any disclaimer, the term of this patent is extended or adjusted under 35 U.S.C. 154(b) by 782 days.

(21) Appl. No.: 14/331,856

(22) Filed: Jul. 15, 2014

(65) Prior Publication Data
US 2014/0327179 A1 Nov. 6, 2014

Related U.S. Application Data

(62) Division of application No. 12/298,403, filed as application No. PCT/US2007/067359 on Apr. 25, 2007.

(60) Provisional application No. 60/745,572, filed on Apr. 25, 2006.

(51) Int. Cl.
| | |
|---|---|
| *B01D 67/00* | (2006.01) |
| *B01D 69/08* | (2006.01) |
| *B29C 45/14* | (2006.01) |
| *B01D 63/02* | (2006.01) |
| *B29C 70/84* | (2006.01) |
| *B29K 101/10* | (2006.01) |
| *B29K 101/12* | (2006.01) |
| *B29L 31/00* | (2006.01) |
| *B29L 31/14* | (2006.01) |

(52) U.S. Cl.
CPC ...... *B29C 45/14385* (2013.01); *B01D 63/022* (2013.01); *B01D 63/023* (2013.01); *B01D 63/024* (2013.01); *B01D 69/08* (2013.01); *B29C 70/84* (2013.01); *B29K 2101/10* (2013.01); *B29K 2101/12* (2013.01); *B29L 2031/14* (2013.01); *B29L 2031/755* (2013.01)

(58) Field of Classification Search
None
See application file for complete search history.

(56) References Cited

U.S. PATENT DOCUMENTS

| | | |
|---|---|---|
| 3,708,071 A | 1/1973 | Crowley |
| 4,138,460 A | 2/1979 | Tigner |
| 4,740,344 A | 4/1988 | Wollenbeck et al. |
| 5,192,478 A | 3/1993 | Caskey |
| 5,228,992 A | 7/1993 | Degen |

(Continued)

FOREIGN PATENT DOCUMENTS

| | | |
|---|---|---|
| EP | 0 168 558 | 1/1986 |
| EP | 0 931 582 | 7/1999 |

(Continued)

*Primary Examiner* — Krishnan S Menon

(57) ABSTRACT

Hollow fiber membranes are potted by injecting a liquid material into a substantially closed cavity (44) containing the fibers. The cavity may be formed in part by the interaction of a mold a permeate pan (52) and a layer of an adhesive pre-applied to a bundle of the membranes.

16 Claims, 4 Drawing Sheets

(56) References Cited

U.S. PATENT DOCUMENTS

| | | | |
|---|---|---|---|
| 5,639,373 | A | 6/1997 | Mahendran et al. |
| 5,922,201 | A | 7/1999 | Yamamori et al. |
| 6,042,677 | A | 3/2000 | Mahendran et al. |
| 6,592,759 | B2 | 7/2003 | Rabie et al. |
| 7,022,231 | B2 | 4/2006 | Mahendran et al. |
| 2002/0153299 | A1* | 10/2002 | Mahendran ............ B01D 61/18 210/321.89 |
| 2005/0126978 | A1 | 6/2005 | Cote et al. |

FOREIGN PATENT DOCUMENTS

| | | |
|---|---|---|
| WO | 97/28953 | 8/1997 |
| WO | 2001/085315 | 11/2001 |
| WO | 2004/037396 | 5/2004 |
| WO | 2006/045191 | 5/2006 |

* cited by examiner

HEADER FOR MODULE OF HOLLOW FIBER MEMBRANES AND METHOD OF POTTING HOLLOW FIBERS

This application is a division of U.S. application Ser. No. 12/298,403, filed May 14, 2009, which is a national phase entry of International Application No. PCT/US2007/067359, filed Apr. 25, 2007, which claims the benefit of US Application Ser. No. 60/745,572, filed Apr. 25, 2006. Application Ser. No. 12/298,403; PCT/US2007/067359; and 60/745,572 are hereby incorporated by reference.

FIELD

This specification may relate to methods of potting hollow fiber membranes, to methods of making headers for modules of hollow fiber membranes, to potted hollow fiber membranes or to headers or modules of potted hollow fiber membranes.

BACKGROUND

The following description does not admit or imply that the apparatus or method discussed below is citable as prior art or part of the general knowledge of a person skilled in the art in any particular country.

In order to filter or permeate with hollow fibre membranes, a large number of thin hollow fibres must be fixed to a header such that their outer surfaces are each completely sealed to the outside of the header but their lumens are open to an inner space in the header. The inner space of the header is then connected to a source of suction or pressure to create a transmembrane pressure across the walls of the membranes and carry fluids to or from the lumens of the membranes.

In U.S. Pat. No. 5,639,373, the ends of an array of fibres are submerged in a fugitive liquid, such as a wax, until the fugitive liquid solidifies around them. A fixing liquid, such as a resin, is then poured over the fugitive liquid and allowed to harden around the membranes. The fugitive liquid is then removed, for example by heating or by dissolution, leaving the lumens of the membranes open to the space formerly occupied by the fugitive liquid. In U.S. Pat. No. 6,042,677, a similar process is used but the array of fibres is held in a bed of powder which is used in place of the solidified fugitive liquid.

In U.S. Pat. No. 5,922,201, a continuous hollow fibre is made into a fabric such that adjacent lengths of the fibres are spaced apart from each other and do not have open ends. An edge of the fabric is inserted into a pot of liquid resin which is centrifuged or vibrated as it cures to encourage flow into the spaces between the fibres. After the resin is cured, the block of resin and fibre is cut to separate the fabric into individual lengths of fibres having open ends. The block of resin is then glued or attached through gaskets to the remainder of a header.

In European Patent Application No. EP 0 931 582, an elastic pipe is used to make a header. An aperture is cut in the pipe and a weir is built up around the aperture. Open ends of hollow fibre membranes are inserted into the aperture by first pulling the aperture open and then allowing it to close on the membranes. Liquid resin is poured over the ends of the membranes and retained in placed by the weir until it cures. Surface tension prevents the resin from flowing through the aperture in spaces between adjacent fibres.

SUMMARY

The following summary is intended to introduce the reader to the specification, but not to define the invention. The invention or inventions may reside in a combination or sub-combination of features found in this summary or in other parts of this document, for example the claims.

The inventors have observed various difficulties with prior art potting methods. In particular, the use of curable, resinous liquids creates various drawbacks. For example, curable materials such as polyurethane, epoxy or silicone are expensive. The time required to cure these materials is also long, typically at least 10 minutes and more often hours because fast curing of a large block of resin creates excess heat. The resins may also require careful mixing or curing procedures, or may release harmful chemicals as they cure. Wicking of the liquid resin up the length of the fibers prior to curing can also be a problem.

In a method of potting hollow fiber membranes, the membranes are provided in a bundle having a layer of a compressible material surrounding the membranes in a plane spaced from the ends of the membranes. The layer of compressible material may be formed by placing layers of hot melt adhesive over sheets of fibers, optionally stacking multiple sheets of the fibers together. The fibers are then placed in a mold which compresses the band of compressible material to form a generally sealed cavity containing the fibers. A molten potting material is injected into the cavity to surround the membranes. The potting material is cooled in the mold and hardens forming a block of solid potting material sealingly connected to the membranes. Optionally, two spaced-apart layers of compressible material may be provided on the bundle. The mold compresses both layers to provide a cavity between the two layers which is filled with injected potting material. In this case, the fixing liquid does not flow to the ends of the membranes which remain open.

In a method of making a header having potted hollow fiber membranes, a method as described above is used to not the membranes into a block of potting material. In one method, the potting material is removed from the mold and then cut to re-open the ends of the fibers. The block of potting material is then sealed to a header pan to form a permeate collection zone in communication with the fiber ends. In another method, a block of potting material formed between two bands of compressible material is sealed to a header pan with the open ends of the fibers, and the layer of compressible material closest to them, inside a permeate collection zone. In another method, a block of potting material is formed between two bands of compressible material while at least the band of compressible material closest to the ends of the membranes is inserted into a header pan. Optionally, both bands of compressible material may be inserted in the header pan. In this way, the block of potting material is formed in or around, and seals to, the top of the header pan and the membranes at the same time.

A method of potting hollow fiber membranes may comprise steps of harming a substantially closed cavity around a portion of the membranes near their ends. A liquid potting material is injected into the cavity and allowed to solidify in the cavity. The potting material may be a thermoplastic or thermoset resin.

The specification also describes potted membranes or headers. In some cases, an assembly of potted membranes has a hand of adhesive, compressible material and a block of a solidified thermoplastic or reaction injection molded potting material. In some cases an assembly of potted membranes has two bands of adhesive compressible material and a block of a solidified potting material between the bands. In other cases, an assembly as described above has a block of potting material sealed to a header pan to form a permeate cavity in communication with ends of the membranes.

BRIEF DESCRIPTION OF THE DRAWINGS

Examples of embodiments of the invention or inventions will be described below with reference to the following figures.

DESCRIPTION OF EMBODIMENTS

Figure 1:
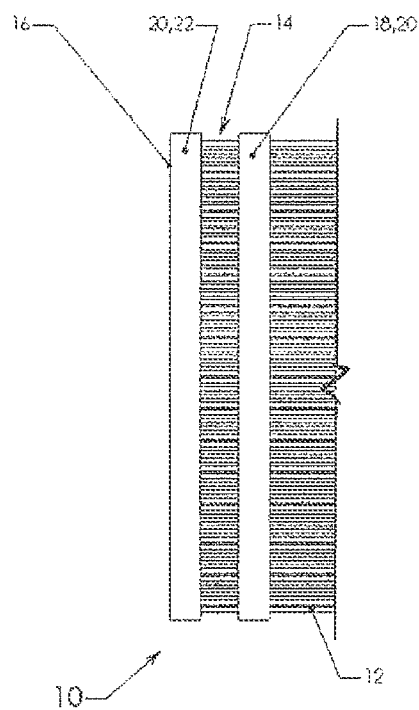
FIG. 1 shows a plan view of a layer of adhesive compressible material placed on a sheet of fibers.

FIG. 1 shows a sheet 10 of hollow fiber membranes 12. The sheet 10 is formed by laying the membranes 12 on a supporting surface, such as a table, so that the membranes 12 are generally parallel to each other but spaced apart from each other, for example from between 0.2 to 2 times their diameter, at least in a potting region 14 near their open ends 16. Optionally, the sheet 10 may be formed by any suitable fabric forming method and have inert fibers running transversely across the membranes 12 to help maintain the membranes 12 in position. Further optionally, the sheet 10 may be formed by winding the membranes 12 onto a drum, preferably through a guide that advances across the face of the drum at a speed, relative to the speed of rotation of the drum, which lays the fibers in a spiral around the drum at a desired spacing. The membranes 12 may have diameters, for example, between 0.5 and 2.5 mm and there may be, for example, between 50 and 400 membranes 12 in a sheet 10. The width of the sheet 10 may be for example, from 400 mm to 1200 mm and the length of the sheet 10, and its membranes 12, may be, for example, between 200 and 3200 mm. In various Figures, the membranes 12 are shown as cut to a shorter length to allow other parts to be shown larger.

A first layer 18 of a compressible adhesive 20 is placed over the sheet 10 so that the ends 16 of the membranes 12 and the first layer 18 of adhesive 20 are on opposite sides of the potting region 14. The adhesive 20 holds the sheet 10 together. The adhesive 20 also seals to the entire outer circumference of the membranes 12, although a perfect bubble tight seal does not need to be formed. The length, width and thickness of the first layer 18 of adhesive 20 are maintained to a size that will cooperate with a mold to be described below. The adhesive 20 may be thermoplastic and applied by first melting it so that it may flow over and around the membranes 12. The adhesive 20 may also be melted after applying it to the membranes 12, or molded or shaped while it is molten to provide a layer of more uniform shape or more carefully controlled size. The adhesive 20 may also be generally soft, so as to be more easily compressed into a seal with the mold, as will be described below, and to provide a cushioning layer for the membranes 12. For example, the adhesive 20 may be of a type normally referred to as hot melt glue, which may be a polyethylene or a blend of ethylene vinyl acetate co-polymers. Alternately, the adhesive may be a resin such as polyurethane or epoxy. Optionally, a second layer 22 of adhesive 20 may also be provided in a manner as described for the first layer 18. However, the second layer 22 is applied between the ends 16 and the potting region 14. The second layer 22 does not cover or fill the ends 16 of the membranes 12. However, the second layer 22 is preferably placed as close as practical to the ends 16 of the membranes 12 without closing the ends 16 to reduce the length of the membranes 12 that will protrude into, and interfere with flows of fluids in, the permeate cavity of a finished header.

Figure 2:
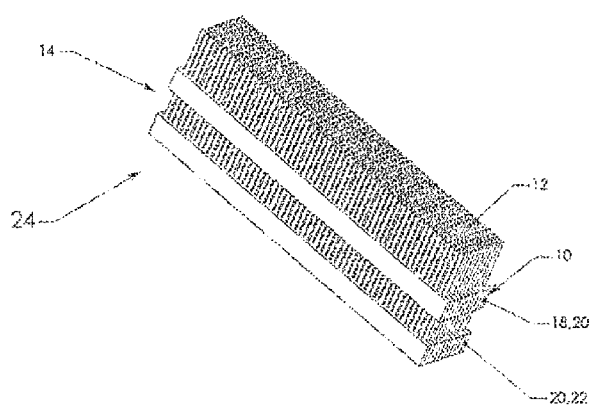
FIG. 2 shows an isometric view of sheets of fibers of FIG. 1 assembled into a larger bundle of fibers having a layer of adhesive, compressible material.

FIG. 2 shows a bundle 24 of membranes 12 made by stacking a number of sheets 10, for example between 1 and 30 or between 10 and 20 sheets 10 together. The sheets 10 are stacked so that the adhesive layers 18, 22 lay on top of each other to generally form a parallelepiped. Optionally, one or more sheets 10 may be rolled up together to generally form a cylinder or made into other shapes. The sheets 10 may be glued, welded or clamped together or simply held together manually or by wrapping a string, wire, hand or other wrap around the bundle 24.

Figure 3:
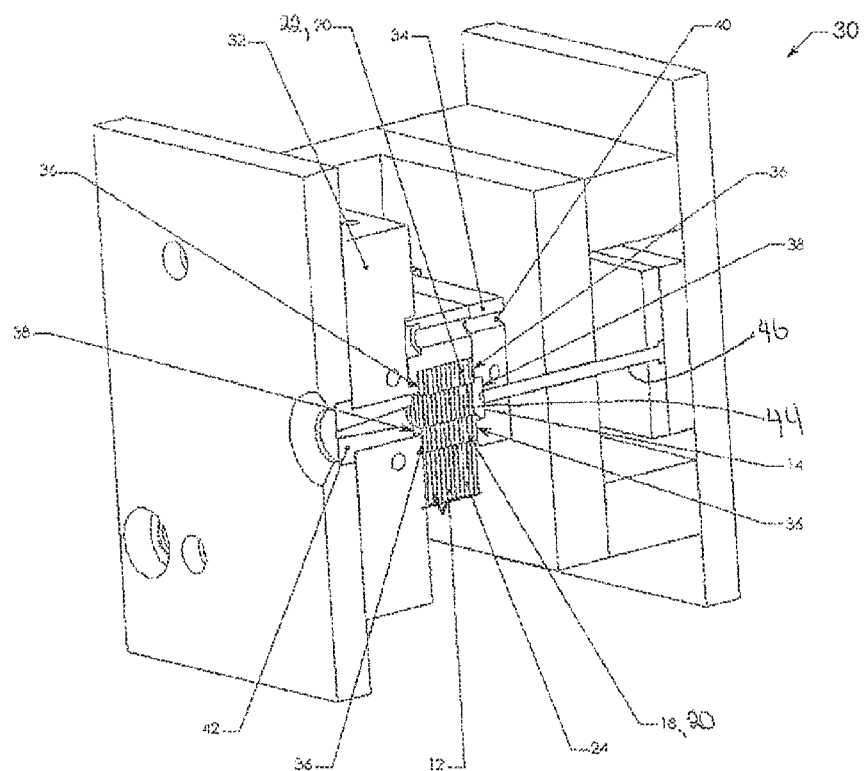
FIG. 3 is a cutaway isometric view of the bundle of FIG. 2 inserted into a first mold.

FIG. 3 shows the bundle 24 placed into a first mold 30. The mold has a first plate 32 and a second plate 34 having contact surfaces 36 and mold surfaces 38. After the bundle 24 is inserted between the plates 32, 34, the plates 32, 34 are brought towards each other by tightening screws, not shown, in screw holes 40. As the plates 32, 34 move together, the contact surfaces 36 compress the adhesive layers 18, 22 and create a temporary seal. A cavity 44 is formed between the mold surfaces 38 of the plates 32, 34, the adhesive layers 18, 22 and ends (not shown) of the first mold which contact the ends of the adhesive layers 18, 22. The potting region 14 of the bundle 24 is inside of the cavity 44. One or more inlet nozzles 42 allow molten potting material to be injected into the cavity 44. One or more ejector pins 46 may be used to get bundle 24 out from the cavity 44 after potting and secondarily to permit air venting of the cavity 44. The cavity 44 is substantially closed in that it surrounds the potting region but for small venting or injection pins. To complete potting the membranes 12, molten potting material is injected into the nozzle 42 to fill the cavity 44. The adhesive layers 18, 22 prevent the potting material from leaving the cavity 44. The potting material flows around the bundle 24 and then penetrates into the spaces between the membranes 12. The potting material is then cooled sufficiently quickly to avoid damage to the membranes 12 or excessive melting of the adhesive layers 18, 22. After the potting material hardens, the plates 32, 34 may be moved apart from each other to remove the potted bundle 24. The inside surfaces of the cavity 44 will have formed substantially all of the exterior surfaces of a solidified mass of potting material. The potting material may be one of the several thermoplastic polymers or resins commonly used in injection molding, such as Polypropylene (PP), Polyethylene (PE), High Density Polyethylene (HDPE), moplastic Elastomer (TPE), Thermopastic Polyurethane (TPU), Acrylonitrile Butadiene Styrene (ABS), Polyamide (PA), polystyrene (PS), Polypropylene (PP), Polyethylene Copolymers or Polyolefin based hotmelt polymers or glues, or any of these materials in a filled form, for example glass filled. The membranes 12 may also be of various types of construction known in the art, but must be sufficiently strong to not be flattened by the injected potting material. For example, the membranes 12 may be reinforced fibers having a braided support such as membranes made by ZENON Environmental Inc. for ZEE-WEED™ 500 series modules. The potting material may have a melting point of 50° C. or more.

Figure 5:
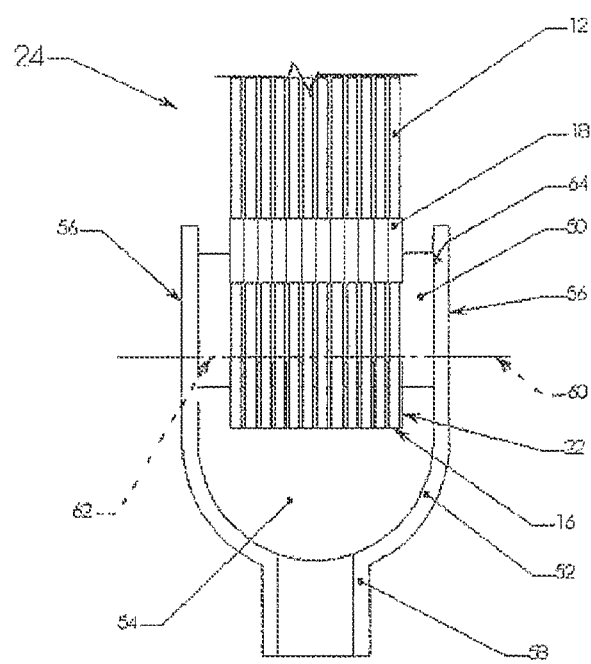
FIG. 5 shows a cutaway view of a potted bundle of membranes attached to a header pan.

After the potted bundle 24 is removed, it can be attached to a header pan 52. As shown in FIG. 5, the ends 16 of the membranes 12 are inserted into the inside of the permeate pan 52 where a permeate (or feed) cavity 54 is formed. The potting material 50 is sealed to the walls 56 of the header pan 52 to close the permeate/feed cavity 54, but for one or more ports 58 in the header pan 52 and the ends 16 of the membranes 12. The connection between the permeate part 52 and the potting material 50 can be made by various methods such as gluing, welding or mechanical fasteners, optionally through a gasket or other intermediate material. Further optionally, the potting material may be cut along line 60 prior to attachment to the header pan 52. This may be done, for example, to provide a smooth lower face 62 if the header pan 52 is to be attached to the lower face 62 rather than the sides 64 of the block of potting material 50. Cutting the potting material 50 may also be done when required to re-open the ends 16, of the membranes 12, for example if a lower layer 22 of adhesive 20 were not used in a modified mold used to create a cavity extending from the first layer 18 of adhesive 20 to beyond the ends 16 of the membranes 12.

Figure 4:
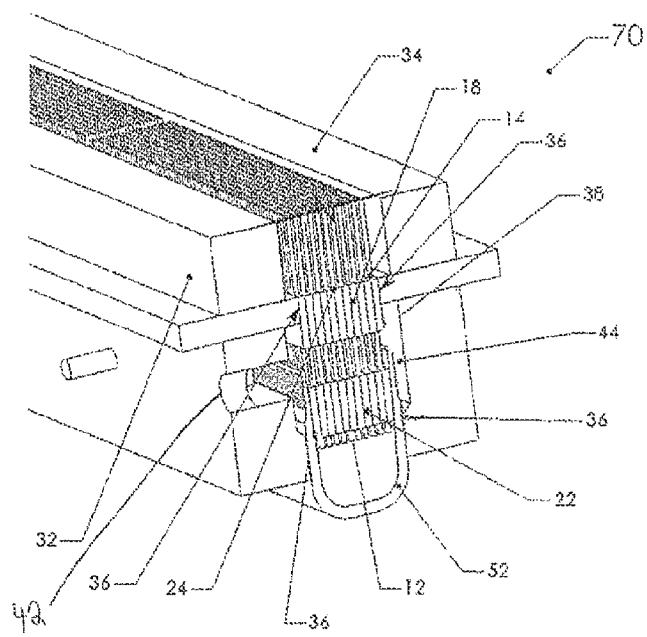
FIG. 4 shows a cutaway isometric view of the bundle of FIG. 2 inserted into a second mold.

FIG. 4 shows a second mold 70. The second mold 70 is similar to the first mold 30 except that one set of contact surfaces 36 have been configured to accept a pre-made header pan 52. The bundle 24 of membranes 12 is inserted into the header pan 52 such that the bottom of the second layer 22 of adhesive 20 is below the to edge of the header pan 52, while the bottom of the first layer 18 of adhesive 20 is above the top edge of the header pan 52. When the plates 32, 34 are moved together, a set of contact surfaces compresses and temporarily seals against the first layer 18 of adhesive 20 while another set of contact surfaces 36 presses and temporarily seals against the permeate pan 52 which in turn compresses and seals against the second layer 22 of adhesive 20. This forms a cavity 44 including the potting area 14 and a region at the top the permeate pan 52. The region at the top of the permeate pan 52 may be inside permeate pan 52 outside the permeate pan 52, or both. When the molten potting material is injected, the potting material flows between and around the membranes 12 and, when cooled to a solid, seals the membranes 12 relative to each other and to the permeate pan 52. Optionally, the walls of the header pan 52 could be extended upwards to also overlap the first layer 18 of adhesive 20 and provided with a port for the injection of potting material into the space between the walls of the header pan 52. The inside of the sides of second mold 70 may then be made flush with the outsides of the header pan 52.

Injection molding of the potting material as described above can be done at applied pressures in the range from 1-300 bar at temperatures from 20-340° C. or 160-340° C. The potting material should remain a solid of sufficient strength in all intended applications, which could involve contact with fluids of up to 60° C. or more. Sample characteristics of the hot melt glue and the potting material are given below:

| Hotmelt | |
| --- | --- |
| Melt temperature | 140-300° C. |
| Strength (Utimate) | 1-4 Mpa |
| Hardness (Shore "A") | Over 40 shore "A" |
| MFI (g/10 min at melting temperature) | 100-1000 g/10 min |

| Potting Material | |
| --- | --- |
| Melt temperature | 160-340° C. |
| Strength (Utimate) | 10-150 Mpa |
| Tensile Modulus | Over 500 Mpa |
| Hardness (Shore "A") | Over 50 shore "A" |
| MFI (g/10 min at melting temperature) | 5-1000 g/10 min |

Figure 7:
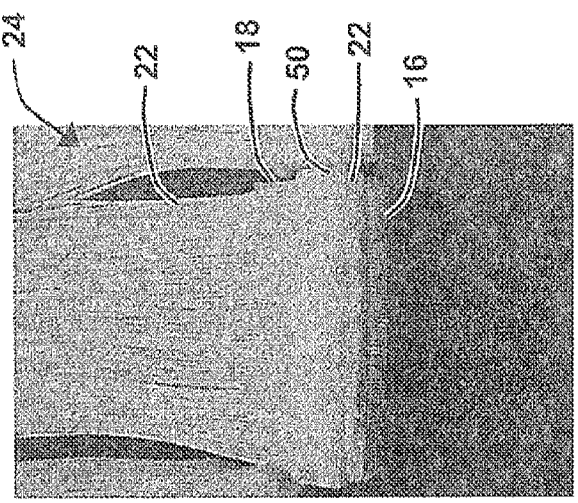
FIG. 7 is a picture of an assembly of potted membranes.
Figure 6:
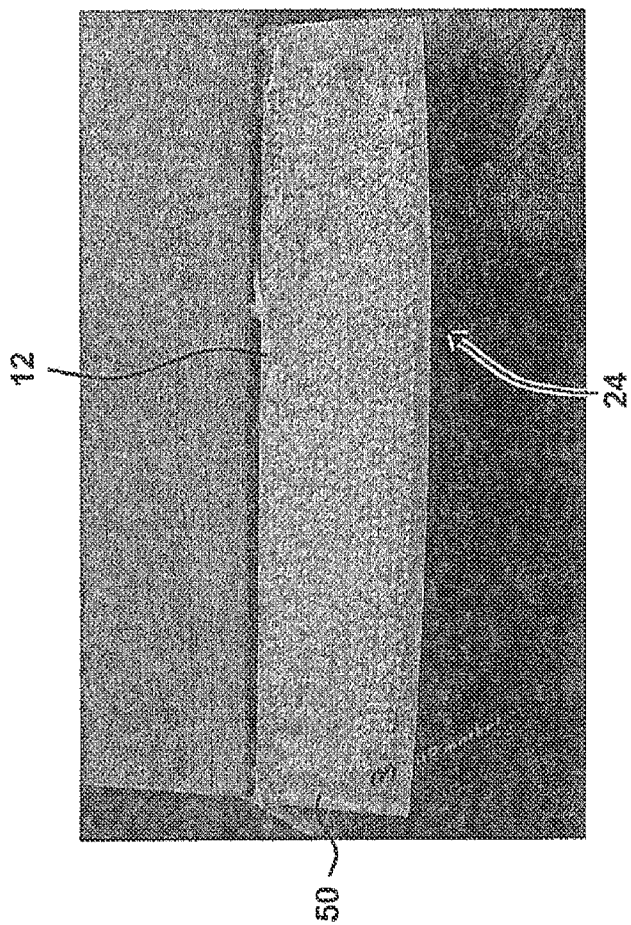
FIG. 6 is a photograph of a bundle of potted fibers cut through the potting material.

For example, membranes 12, as used in ZEEWEED™ 500 series modules by Zenon Environmental Inc. were potted in a first mold 30 using 3 types of polypropylene, having melt flow indexes between about 10 g/10 min and 1000 g/10 min. Satisfactory results were obtained in potting bundles 24 having 14 sheets 10 of membranes 12 using temperatures between 195 and 230° C. and injection pressures between 90 and 110 bar. FIG. 6 shows one such potted bundle 24 cut through the polypropylene potting material 50. FIG. 7 is a photograph of the exterior of another such bundle.

The processes and apparatuses described above may also be used with chemical reaction resin systems. In such a case, the liquid polymer may be created by mixing two or more chemically reactive components. The liquid is still injected under pressure, and may still transfer heat to the mold because of an exothermic reaction, but the potting material solidifies by chemical reaction. Using conventional potting resins, the methods and apparatuses above may still provide benefits such as avoiding the need for centrifuging or fugitive potting materials while still inhibiting potting material from creeping up the fibers before solidifying. However, where liquid potting material is created and injected according to a reaction injection molding process, injection and cure time may be in the range of 5 minutes or less or 2 minutes or less. In reaction injection molding two chemically reactive liquid components, for example isocynate and polyol are each held in separate temperature-controlled and agitated feed tanks. From these tanks, the liquids are sent through supply lines and metering units under high pressure to a mixhead device having an outlet connected to the cavity 44. To inject the liquid potting material, valves in the mixhead are opened allowing the liquids into the mixhead, where they mix, and into the cavity 44. Although pressures in the mixhead may be very high, for example over 1,000 psi, pressure leaving the mixhead may be as low as slightly above atmospheric pressure. The solidified liquids cure in the cavity 44 into a solid block of potting material, for example polyurethane. After curing, the membrane assembly may be demolded.

The invention may be practiced with many variations from the embodiments described above without departing from the scope of the invention. For example, but without limitation, the invention may be used with tubular membranes.

We claim:

1. A method of producing a membrane module comprising the steps of:
  a) forming a bundle of hollow fiber membranes, the membranes held together by a layer of adhesive material spaced from the ends of the membranes to provide a potting region between the layer of adhesive material and the ends of the membranes;
  b) placing the bundle of membranes in a mold wherein the mold seals against the adhesive material to form a substantially closed cavity surrounding the potting region;
  c) injecting a liquid potting material into the cavity such that the potting material flows around the membranes; and, d) solidifying the potting material in a seal with the membranes.

2. The method of claim 1 wherein the potting material is a thermoplastic material that is made liquid by melting it and solidified by cooling it.

3. The method of claim 1 wherein the potting material is a thermosetting resin.

4. The method of claim 3 wherein the thermosetting resin is usable in a reaction injection molding process.

5. The method of claim 1 wherein the bundle is formed with a second layer of adhesive material on the opposite side of the potting region from the layer of adhesive material, and the cavity is formed in part by the second layer of adhesive material.

6. The method of claim 5 wherein the cavity is formed in part by the mold sealing against the second layer of adhesive material.

7. The method of claim 5 wherein the cavity is formed in part by the mold sealing against a permeate pan surrounding the ends of the membranes and the permeate pan sealing against the second layer of adhesive, the cavity arranged to also include a part of the surface of the walls of the permeate pan.

8. The method of claim 7 wherein the permeate pan is sealed against both layers of adhesive.

9. The method of claim 1 further comprising sealing the potting material to a permeate pan to form a fluid cavity in the permeate pan in communication with the ends of the membranes.

10. The method of claim 1 wherein the potting material is a thermoplastic material and step (c) comprises a step of melting the thermoplastic material.

11. The method of claim 1 wherein step (c) comprises mixing at least two chemically reactive components to form the liquid potting material.

12. The method of claim 11 wherein the chemically reactive components are parts of a reaction injection molding thermoset.

13. A method of potting hollow fiber membranes comprising the steps of,
   a) forming a substantially closed cavity around a portion of the membranes near their ends;
   b) injecting a liquid potting material into the cavity; and,
   c) allowing the liquid potting material to solidify.

14. The method of claim 13 wherein the potting material is a thermoplastic resin or polymer having a melt point of 50° C. or more and step (b) comprises melting the resin or polymer.

15. The method of claim 13 wherein the potting material is a thermoset resin.

16. The method of claim 13 wherein steps (b) and (c) comprise reaction injection molding.

* * * * *